UNITED STATES PATENT OFFICE.

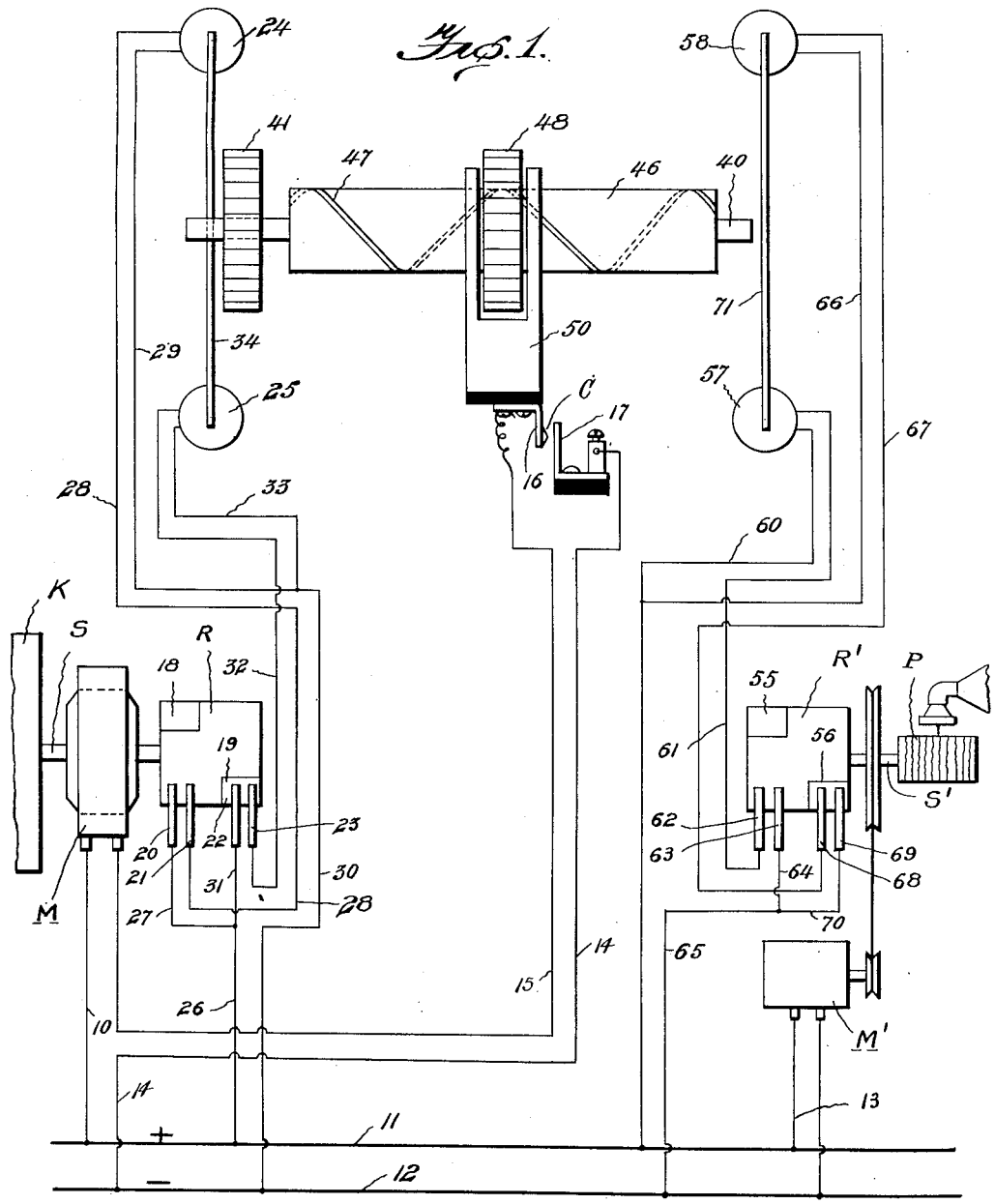

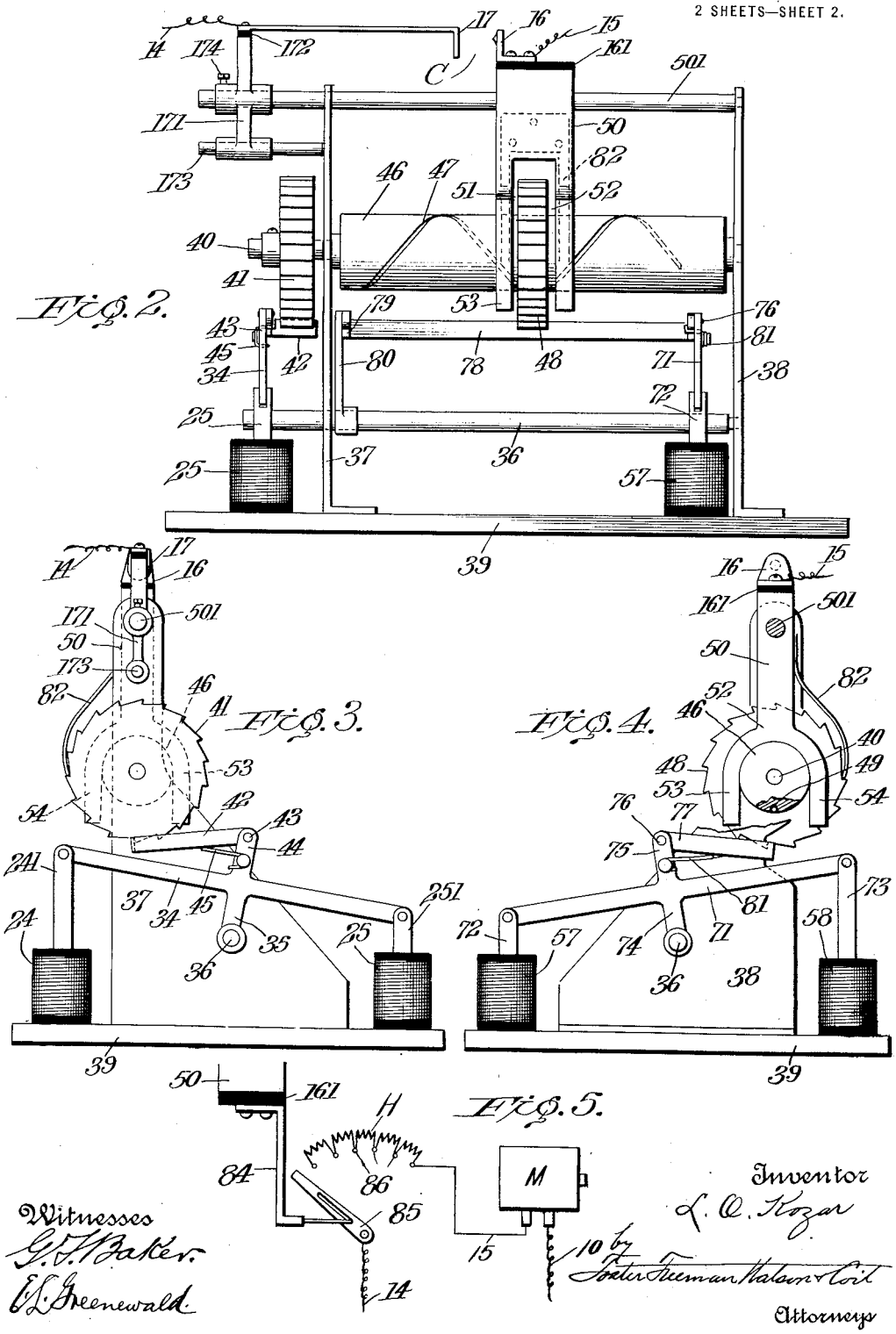

LADISLAV O. KOZAR, OF MIDDLETOWN, PENNSYLVANIA.

SYNCHRONIZING APPARATUS.

1,314,081. Specification of Letters Patent. Patented Aug. 26, 1919.

Application filed April 9, 1915. Serial No. 20,237.

*To all whom it may concern:*

Be it known that I, LADISLAV O. KOZAR, a citizen of the United States, residing at Middletown, Dauphin county, State of Pennsylvania, have invented certain new and useful Improvements in Synchronizing Apparatus, of which the following is a specification.

This invention relates to synchronizing apparatus, that is to a mechanism for synchronizing two independently moving elements so that each will have the same speed of movement.

The principal object of my invention is to provide an apparatus consisting of a combination of electrical and mechanical devices which, when properly connected and located with respect to two rotating elements or machines, will maintain one of the machines in synchronism with the other.

The above and other objects and the novel features of my invention will be apparent from the following description, taken in connection with the drawing, in which—

Figure 1 is a diagrammatic representation of the mechanisms and circuits connecting them;

Fig. 2 is a side elevation of a part of the synchronizing apparatus;

Fig. 3 is a left end elevation of the apparatus shown in Fig. 2;

Fig. 4 is a right end elevation of the apparatus shown in Fig. 2; and

Fig. 5 is a detail view of another form of circuit closing device controlled by the synchronizing apparatus.

Referring to Fig. 1 of the drawing, I have shown the invention as embodied in an arrangement for synchronizing a moving picture machine or kinetoscope and a phonograph. It is to be understood, of course, that the invention is not limited to such an application and may be embodied in an arrangement for synchronizing reciprocating mechanisms as well as rotating mechanisms.

The moving picture machine is diagrammatically illustrated by the part designated K and the cylinder or sound record of the phonograph is designated as P. In the illustration the machine K is driven by an electric motor M which derives its current from the supply mains 11 and 12 through the wires 10, 14 and 15.

The electric motor M which drives the rotating parts of the moving picture machine is a variable speed motor, as the kinetoscope must be driven by some electrically controlled rotor. The electric motor M is electrically connected to the supply mains 11 and 12 by means of the conductors 10, 14 and 15, and the flow of current through the conductors 10, 14 and 15 is controlled by a controller or circuit interrupting device C, consisting of a movable contact 16 connected to the wire 15 and an adjustable contact 17 connected to the wire 14. The operation of the controlling device C will be explained later.

The means for driving the rotating shaft S' and the record P of the phonograph consists of an electric motor M' which is electrically connected to the supply mains 11 and 12 by means of the conductors 13. The electric motor M' is shown as belt connected to the shaft S', but it is to be understood that the shaft S' may be directly driven by the motor M' if desired, the arrangement being merely to obtain a speed reduction.

According to the arrangement herein shown it is proposed that the operation of the moving picture machine and its motor be synchronized with the operation of the phonograph and its motor. The shaft S driven by the motor M carries or drives a cylindrical commutator R which is provided with two contacting plates 18 and 19 curved to fit the commutator, disposed on diametrically opposite sides thereof and in symmetrical relation and insulated from each other. As the commutator R rotates the plate 18 contacts with the pair of brushes, 20, 21 and closes a circuit therethrough and the plate 19 contacts with the pair of brushes 22, 23 and closes a circuit therethrough.

The alternate closing of the circuits by the plates 18 and 19 alternately energizes and operates the solenoid magnets 24 and 25, respectively. When the plate 18 closes the circuit at the brushes 20, 21, current is supplied to the electromagnet 24 from the supply mains 11 and 12 by the following path: positive supply main 11, wires 26 and 27, brush 20, plate 18, brush 21, wire 28, magnet winding 24, wire 29, wire 30 to the negative supply main 12. When the plate 19 closes the circuit at the brushes 22, 23, current is supplied to the electromagnet 25 by the following path: positive supply main 11, wires 26, 31, brush 22, plate 19, brush 23, wire 32, winding of the electromagnet 25, wires 33 and 30 to the negative supply main 12.

The alternate energizing of the electromagnets 24 and 25 causes the plungers 241 and 251 thereof to rock the lever 34 to which those plungers are pivotally connected, see Fig. 3. The lever 34 has an arm 35 at its center which pivotally supports it on the outer end of a guide rod 36 fixedly mounted in the two end plates 37 and 38. The end plates 37 and 38 are secured to a base plate 39 and rotatably support a shaft 40. The shaft 40 projects beyond the end plate 37 and has a ratchet wheel 41 fastened to the projecting end thereof. The ratchet wheel 41 and the shaft 40 to which it is connected receive an intermittent rotary movement from the oscillating lever 34 by means of a pawl 42 which is pivoted at 43 to an arm 44 midway between the ends of the lever 34. The pawl 42 is notched at its end to fit the teeth of the ratchet wheel 41 and its free end is held in engagement therewith by means of the spring 45 which bears against the under side of the pawl 42 and is carried by the arm 44.

A cylinder 46 is mounted on and fixed to rotate with the shaft 40 and is located between the end plates 37 and 38. The surface of the cylinder 46 is provided with a cam groove 47 which extends spirally along the outer surface of the cylinder from end to end. A second ratchet wheel 48 of the same diameter and number of teeth has a bore to fit the cylinder 46 and a tooth 49 thereon projecting into the groove 47. The ratchet wheel 48 is therefore splined to the cylinder 47 so that it may move longitudinally thereof and so that the cylinder and ratchet wheel may rotate together.

The yoke 50 is pivoted at one end on the guide rod 501 which is fixed in the end plates 37, 38 of the device. The free end of the yoke 50 is provided with arms 51 and 52 which extend on opposite sides of the ratchet wheel 48 and each one of the arms 51 and 52 is provided with bifurcated parts 53 and 54 which extend around the axis of the cylinder to guide the yoke 50 along the cylinder. It will therefore be seen that when the cylinder 46 is rotated the ratchet wheel 48, being stationary or rotating slower than the cylinder, will be caused by the cam groove 47 to move longitudinally of the cylinder toward the right. The movement of the ratchet wheel 48 in either direction will carry with it the yoke 50 which is guided by the rod 501.

At its upper end the yoke 50 carries the contact 16 of the circuit closing or governing device C which is insulated from the yoke by a block of insulation 161. The stationary contact 17 is supported on the adjustable bracket 171 and insulated therefrom by the block of insulation 172. The bracket 171 is provided with two bosses which slidably fit the outer extension of the rod 501 and a short parallel rod 173 fixed in the end plate 37 and extending outwardly parallel to the rod 501. The bracket 171 is adapted to be secured in adjusted position by means of a set screw 174. It will be seen that by the movement of the ratchet wheel 48 and yoke 50 the circuit of the motor M will be opened and closed depending on the relative movement of the ratchet wheel 41 and cylinder 46 with respect to the ratchet wheel 48.

An intermittent rotating movement is imparted to the ratchet wheel 48 by a solenoid mechanism similar in most respects to the solenoid mechanism which intermittently rotates the ratchet wheel 41. The motor M' drives the shaft S' and a commutator device R' is mounted on the said shaft or driven thereby. The commutator R' is similar in construction to the commutator R, being cylindrical in shape and provided with two curved contacting plates 55 and 56 located on diametrically opposite sides thereof and insulated from each other. The plates 55 and 56 are designed to alternately energize the windings of the solenoid magnets 57 and 58, respectively, when the motor M' is running. When the plate 55 is in the proper position current will be supplied to the electromagnet 57 by the following path: positive supply main 11, wires 59 and 60, winding of the electromagnet 57, wire 61, brush 62, plate 55, brush 63, wires 64 and 65 to the negative supply main 12. When the connecting plate 56 is in the position indicated in Fig. 1, current will be supplied to the electromagnet 58 by the following path: positive supply main 11, wires 59 and 66, winding of the electromagnet 58, wire 67, brush 68, plate 56, brush 69, wires 70 and 65 to the negative supply main 12.

The alternate energization of the electromagnets 57 and 58 effects the oscillation of a lever 71 (Fig. 4) which is pivotally connected to the plungers 72 and 73 of the electromagnets and rockably mounted by an arm 74 upon an end of the guide rod 36. The lever 71 has an arm 75 midway between its ends which at 76 pivotally supports one arm 77 of a pawl member 78. The pawl member 78 has another arm 79 which is pivoted on the bar 80 mounted on the rod 36. The pawl member 78 is necessarily as long as the groove 47 or at least as long as the length of travel of the ratchet wheel 48 so that it will always be capable of engaging the ratchet wheel no matter to which position it moves. The pawl 78 is yieldingly held in engagement with the ratchet wheel 48 by means of a spring 81 located on the arm 75 of the lever 71. It will be obvious that the oscillation of the lever 71 will reciprocate the pawl 77 and intermittently rotate the ratchet wheel 48. In order to prevent a reversal of the ratchet wheel 48 a spring 82 is provided which is fastened at one end to the yoke 50 and engages the teeth of the ratchet wheel 48 at its free end.

The operation of the machine is briefly as follows: The electric machine M' which drives the shaft S' and phonograph P being set in motion serves to alternately cause the energization of the electromagnets 57 and 58, which set the ratchet wheel 48 in motion. The screw thread on the cylinder 46 quickly drives the ratchet wheel 48 and yoke or carrying device 50 to be moved to the right in Fig. 1 until the circuit of the motor M is established by the closing of the contacts 16 and 17. The motor M then starts the kinetoscope and the commutator R, which latter causes the energization of the solenoid magnets 24, 25, whereby the ratchet wheel 41 is set in motion independently of the ratchet wheel 48, the direction of the cam groove 47 being such that the ratchets work in opposition to each other or differentially with respect to each other. So long as the speed of rotation of the machines P and K (of the mechanisms) is the same, the ratchet wheels 41 and 48 will rotate at substantially the same speed and there will be no relative movement between them. However, when there is a difference of speed between the mechanisms there will be a differential movement of the two ratchet wheels axially with respect to each other and the circuit of the motor M will be broken. When the motor M slows down, the speed of rotation of the ratchet wheel 41 will be decreased and the wheel 48 will be moved to the right again to close the circuit of the motor M. Consequently there will be a making and breaking of the circuit of the motor M and the number of revolutions of the two machines will be made substantially the same.

In order to add or subtract a few revolutions to bring the apparatus into absolute synchronism or coincidence, the contact 17 may be adjusted a slight amount along the rods 501 and 173. By moving the contact 17 to the left in Fig. 2 an added number of revolutions will be required to close the circuit at the device C and consequently a number of revolutions will be added to the number of revolutions of the motor controlled by the switch C. A movement in the opposite direction will cause the opposite effect, that is, the number of revolutions will be decreased according to the amount of adjustment. This arrangement may therefore be termed an accelerating and retarding device.

It may not be desirable in some cases to have such interruptions and in order to obviate this the motor M may be a variable speed motor and for the controlling device C a rheostat H of suitable construction and arrangement, such as shown in Fig. 5, may be substituted, the carrier 50 being provided with an arm 84 to carry the free end of the rheostat arm 85 over the resistances 86, as will be readily understood.

The synchronizing apparatus herein disclosed has been constructed especially for synchronizing sound producing devices with motion picture apparatus where the slight variations of speed are negligible, but the invention is not limited to such a specific application, as it can be used in any case where it is desirable to electrically synchronize the movements of two mechanisms, for example, in electric transmission of drawings or handwriting.

It will be understood that the two machines to be synchronized need not necessarily be driven by electricity. The controller arm of the yoke or carrier 50 actuated by the movable ratchet wheel may be strong enough to be connected to the shiftable lever of a friction transmission so that the speed of the machine to be synchronized could be controlled by means of the friction transmission. Furthermore the two solenoid devices may be replaced by some mechanical reciprocating arms connected to the machines to be synchronized so as to set the pawls in motion. Electrical mechanism is used in the present embodiment of my invention on account of the great convenience in the transmission of energy. Not only rotating movements but also reciprocating movements may be synchronized by the method herein described.

Having thus described the invention, what is claimed and desired to be secured by Letters Patent is:

1. In an apparatus of the class described, the combination of two moving elements, a device rotated intermittently in one direction by one of said elements, a second device adapted to be intermittently rotated in the same direction by the other element, means for effecting relative longitudinal movement between the devices when one of said elements moves faster than the other, and means actuated by such relative movement for controlling movement of one of said elements.

2. In an apparatus of the class described, the combination of two moving elements, a device rotated intermittently in one direction by one of said elements, a second device mounted coaxial with and adapted to be intermittently rotated in the same direction as the first said device by the other element, means for effecting relative axial movement between said devices when one of said elements moves faster than the other, and means actuated by such axial movement for controlling movement of one of said elements.

3. The combination with two rotating elements, of means for synchronizing said elements comprising a device adapted to be intermittently rotated in one direction by one of said elements, a second device adapted to be intermittently rotated in the same direction by the other element, an electric circuit controlling movement of the last said element, means for effecting relative bodily movement between said devices when the speed of one element differs from that of the other, and means for closing said circuit adapted to be actuated by said relative movement between said devices.

4. The combination with two rotating elements, of a toothed wheel adapted to be intermittently rotated in one direction by one of said elements, a second toothed wheel mounted coaxial with and adapted to be intermittently rotated in the same direction as the first said wheel by the other said element, an electric circuit for supplying power to the last said element, means for effecting relative axial movement between said toothed wheels when the speeds of said elements differ, and means controlling said circuit adapted to be actuated by such relative movement between said wheels.

5. A synchronizing apparatus comprising a threaded cylindrical member, a sleeve member mounted on said cylindrical member and having a part fitting the thread thereof, means for turning said cylindrical member intermittently and in one direction only, means for turning the sleeve intermittently and in one direction only, separate mechanisms controlling said turning means, and a governing device for one of said mechanisms controlled by the movements of that one of said members which is operated by the turning means controlled by the other mechanism.

6. A synchronizing apparatus including in combination two rotating elements, a rotatably mounted cylindrical member, a ratchet wheel secured thereto, an oscillating pawl coöperating with said wheel controlled by one of said elements, a second ratchet wheel threaded on said cylindrical member, an oscillating pawl coöperating with said second wheel controlled by the other of said elements, the second pawl being of greater width than the longitudinal path of movement of the second wheel, and means controlled by said longitudinal movement for governing the rotation of one of said elements.

7. The combination with two rotating elements, of a threaded cylindrical member, means controlled by one of said elements for intermittently turning said cylindrical member in one direction, a sleeve mounted on and engaging the thread of said cylindrical member, means controlled by the other said element for intermittently turning the sleeve in the same direction, whereby the sleeve and cylindrical member will have a relative axial movement if the speeds of said elements differ, and means controlled by said relative movement between said sleeve and cylindrical member for actuating one of said elements.

8. In a synchronizing apparatus, the combination of two differentially connected devices, mechanism for driving one of said devices in accordance with the speed of a machine in motion, a second mechanism for driving the other device in the same direction as the first device is driven and in accordance with the speed of the machine to be synchronized with said machine in motion, means controlled by one of said devices and capable of controlling the power supply to said machine to be synchronized, and adjusting means for said controlling means.

9. In an apparatus of the class described the combination of two moving elements, a device rotated in one direction by one of said elements, a second device adapted to be rotated in the same direction by the other element, means for effecting relative movement between the devices when one of said elements moves faster than the other, means actuated by such relative movement for controlling movement of one of said elements, and adjusting means for said controlling means.

10. In an apparatus of the class described, the combination of two moving elements, a device rotated in one direction by one of said elements, a second device adapted to be rotated in the same direction by the other element, means for effecting relative movement between the devices when one of said elements moves faster than the other, an adjustable stationary electrical contact, and a movable electrical contact actuated by such relative movement and coöperating with said stationary contact for controlling the movement of one of said elements.

In testimony whereof I affix my signature in presence of two witnesses.

LADISLAV O. KOZAR.

Witnesses:
M. B. O'DONNELL,
ARTHUR R. RUPLEY.